Nov. 13, 1934.                W. J. NEWMAN ET AL                1,980,693
                                BALANCING DEVICE
                               Filed March 22, 1933
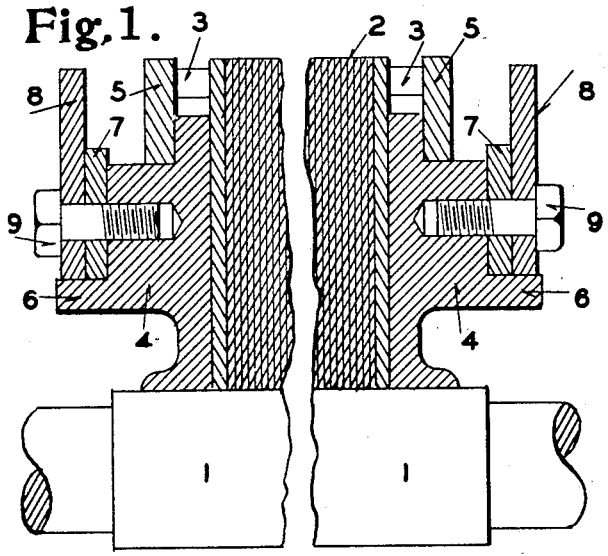
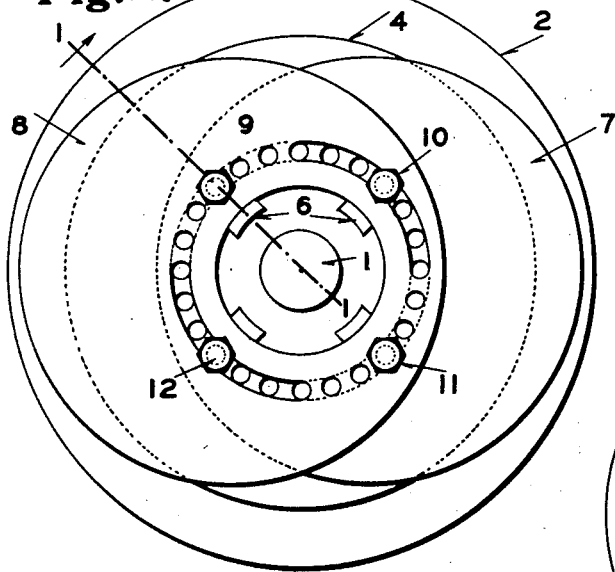
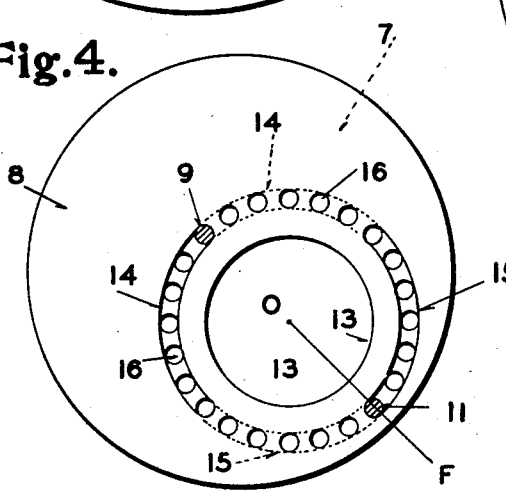
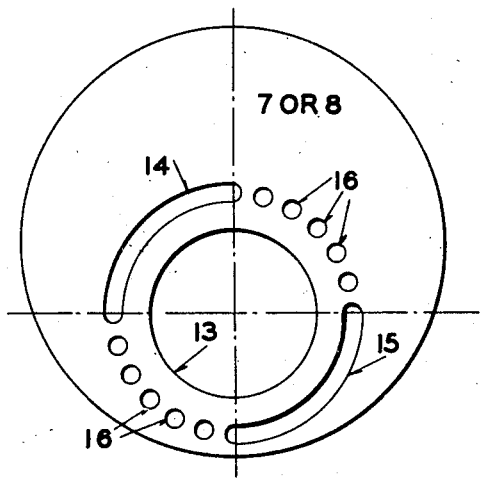
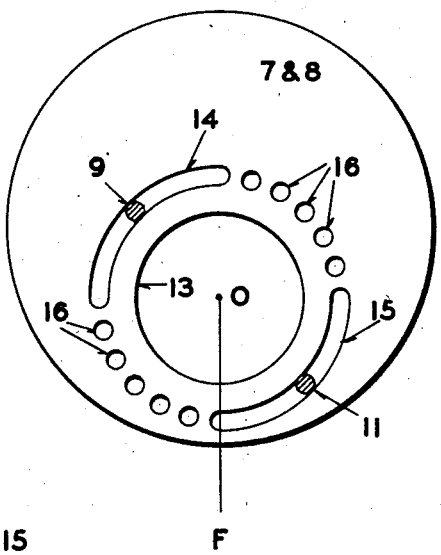
Inventors
W. J. NEWMAN
F. W. MUNSON
By 
Att'y.

Patented Nov. 13, 1934

1,980,693

UNITED STATES PATENT OFFICE 1,980,693

BALANCING DEVICE

Walter J. Newman, Maplewood, and Fred W. Munson, Overland, Mo., assignors to Wagner Electric Corporation, St. Louis, Mo., a corporation of Missouri Application March 22, 1933, Serial No. 662,034

3 Claims. (Cl. 74—573)

Our invention relates to the balancing of rotatable members and more particularly to improvements in the adjustable weights for the balancing device and their means of attachment.

One of the objects of our invention is to produce a pair of adjustable weights for a balancing device that can be adjusted to their proper balancing position in a minimum of time.

Another object of our invention is to produce a balancing device that is economical to manufacture, easily and permanently attached to a rotatable member, and which occupies a minimum amount of space.

Other objects of our invention will become apparent from the following description taken in connection with the accompanying drawing in which Figure 1 is a cross sectional view on the line 1—1 of Figure 2 showing a dynamo electric machine rotor provided with our improved balancing device at each end for dynamically balancing the same; Figure 2 is an end view of Figure 1; Figure 3 is a plan view of one of the balancing weights; and Figures 4 and 5 are views showing how the weights are originally positioned on the rotor for two different radial positions of the line of unbalancing force of the rotor.

Referring in detail to the drawing, we have illustrated our improved balancing device as being employed for balancing the squirrel cage rotor of a dynamo electric machine, but it is to be understood that it may be used equally well to balance other rotatable members. The numeral 1 indicates the rotor shaft upon which is mounted the slotted laminæ 2 carrying the conductor bars 3. The laminæ are held in position by end plates 4 which also engage the end rings 5 connecting the conductor bars. Each end plate 4 is provided with annularly positioned projections 6 upon which are mounted our improved balancing device comprising a pair of discs 7 and 8. The discs are held in adjusted angular position on the end plate 4 by the four cap screws 9, 10, 11 and 12 equally spaced from each other and the axis of the shaft.

The balancing discs 7 and 8 are of identical construction and comprise a circular disc of sheet metal provided with an opening 13 eccentric to the center of the disc. On opposite sides of this opening the disc is provided with arcuate slots 14 and 15, each extending over an arc of 90 degrees as shown. A plurality of equally spaced apart holes 16 are provided in the disc intermediate the adjacent ends of the slots, said holes being the same radial distance from the center of opening 13 as are the slots. Although we have disclosed the slots and holes in the discs as having certain positions with respect to the horizontal and vertical axes through the center of opening 13 (Figure 3) it is to be understood that they may assume other annular positions and the slots may be other lengths. With the holes, slots, and cap screws in the relation shown, the cap screws will rigidly hold the discs from relative rotation in any adjusted position the discs may assume, since each cap screw will be at the end of a slot or extend through a hole.

The arrangement of the arcuate slots in the manner shown, also permits the rotor to be balanced in a minium amount of time. The direction of the line of the unbalancing force at each end of the rotor is first determined in a manner well known in the art. The discs 7 and 8 may, during this operation, be mounted on the rotor with their centers of gravity diametrically opposed, as shown in Figure 2, or they may be left off. After the line of unbalancing force has been determined for each end of the rotor, first one end and then the other end of the rotor is balanced. The discs are positioned so that both of their centers of gravity are diametrically opposite the unbalancing force, and then they are rotated an equal amount in opposite directions and to a position where their resultant force will be equal and opposite the unbalancing force, thus balancing the rotor. To secure a well balanced rotor it may be necessary to rebalance the end which was first balanced after the second end has been balanced since the balancing of the second end may throw off the balance of the end first balanced.

Examples of how the arrangement of the slots, holes, and cap screws results in securing a quick balance for different positions of the unbalancing force, are shown in Figures 4 and 5. In Figure 4 it is assumed that the line of the unbalancing force of passes through the hole occupied by the cap screw 11. The discs 7 and 8 are then placed in the positions shown, with their centers of gravity opposite the unbalancing force and the ends of their slots in overlapping relation. The cap screws 9 and 11 are placed in their respective holes and screwed down sufficiently to hold the discs in position. If, after testing the rotor for balance, the combined force of the balancing discs is found to be greater than the unbalancing force, the cap screws 9 and 11 are loosened and the disc 7 moved in a counterclockwise direction and the disc 8 moved an equal distance in a clockwise direction. The cap screws are then tightened and the rotor is again tested to see if it is balanced. If the rotor is not balanced, the operation is repeated until the discs are in a position where their resultant force balances the unbalancing force. Since the slots in each disc cover a 90 degree arc, each disc may be rotated 90 degrees, thus permitting the resultant force of the balancing discs to be varied from a maximum to zero without removing the cap screws 9 and 11 or the discs. After the discs have been adjusted to their proper balancing position, the cap screws 10 and 12 are screwed into place, each passing through a hole 16 in each disc, thereby securing the discs against relative rotation. If a hole 16 should not align with the holes for the cap screws 10 and 12 when the rotor is balanced, the discs are moved relatively sufficiently to bring the nearest holes into alignment.

In Figure 5 the line of unbalancing force is assumed as lying intermediate the holes for the cap screws 11 and 12, as indicated. Under these conditions the discs 7 and 8 are placed upon the rotor with their centers of gravity opposite the unbalancing force and with the slots 14 and 15 coinciding. By first using the cap screws 9 and 11, it is seen that the discs may be rotated in opposite directions through angles of 45 degrees. In this position the ends of the slots will be in overlapping relation. If it is necessary to move the discs farther to secure a balance, it is only necessary to insert the cap screws 10 and 12 and remove the cap screws 9 and 11. If the final balanced position of the discs is at the position where the ends of the slots are overlapping, the cap screws will pass through the ends of the slots, thus insuring no relative rotation of the discs. In any other final position of the discs, some of the cap screws will pass through some of the holes 16, thus also insuring no relative rotation of the discs.

From the foregoing description it is readily seen that with our improved balancing device the rotor may be very rapidly balanced as much time is saved in eliminating the removal of the cap screws each time the balancing discs are adjusted to bring about a balance, while at the same time employing means for permanently securing the discs in adjusted angular relation. Also, by using discs of the kind shown, the cost of manufacture is reduced to a minimum as they may be stamped out of a sheet of metal by a single operation. The space occupied by the discs is also very small, thus not appreciably increasing the over-all dimensions of the rotor.

Having fully described our invention, what we claim as new and desire to secure by Letters Patent of the United States is:

1. In a dynamo electric machine, the combination of a rotor, a pair of identical circular balancing discs of uniform thickness, each provided with an eccentric opening, means for mounting said discs on the rotor with the axes of the openings coinciding with the axis of the rotor, each of said discs also being provided with a pair of 90 degree arcuate slots positioned on diametrically opposite sides of the eccentric opening, a plurality of equally spaced holes intermediate the slots, a pair of bolts on the rotor positioned diametrically opposite the axis thereof and each extending through a slot in each disc whereby in balancing the rotor it is only necessary to loosen the bolts, rotate the discs relative to the rotor and bolts and to each other to place them in an adjusted position and then tighten the bolts to secure the discs in said adjusted position, and a second pair of bolts on the rotor positioned diametrically opposite the axis thereof and each adapted to cooperate with a hole or an end of a slot in each disc to additionally secure the discs to the rotor and to prevent their rotation relative to the rotor after the discs have been adjusted to the balanced position.

2. In a dynamo electric machine, the combination of a rotor, a pair of circular balancing discs each provided with an eccentric opening, means for mounting said discs on the rotor with the axes of the openings coinciding with the axis of the rotor, each of said discs also being provided with a pair of arcuate slots on opposte sides of the eccentric opening and a plurality of holes intermediate the slots, and bolts passing through said slots and holes for securing the discs in adjusted angular relation to the rotor, some of said bolts cooperating with the slots in each disc whereby when the other bolts are removed the discs may be rotated relative to each other for adjustment.

3. In a dynamo electric machine, the combination of a rotor, a pair of circular balancing discs, each provided with an eccentric opening, flanged means on the rotor cooperating with the walls of the eccentric openings of the discs for supporting the discs on the rotor with the axis of the openings coinciding with the axis of the rotor, each of said discs also being provided with a pair of 90 degree arcuate slots on opposite sides of the eccentric openings and a plurality of holes intermediate the slots, and bolts cooperating with the slots and holes for securing the discs to the rotor in adjusted angular relation, some of said bolts cooperating with the slots in each disc whereby when the other bolts are removed the discs may be rotated relative to each other for adjustment.

WALTER J. NEWMAN.
FRED W. MUNSON.